(12) United States Patent
Schiebahn et al.

(10) Patent No.: US 11,214,300 B2
(45) Date of Patent: Jan. 4, 2022

(54) SYSTEM AND METHOD FOR OPERATING A MOTOR VEHICLE

(71) Applicant: Ford Global Technologies, LLC, Dearborn, MI (US)

(72) Inventors: Michael Schiebahn, Bornheim (DE); Peter W. A. Zegelaar, Heerlen (NL); Helmuth Bosch, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 681 days.

(21) Appl. No.: 15/600,167

(22) Filed: May 19, 2017

(65) Prior Publication Data

US 2017/0334483 A1 Nov. 23, 2017

(30) Foreign Application Priority Data

May 20, 2016 (DE) .................... DE102016208703.7

(51) Int. Cl.
*B62D 6/00* (2006.01)
*G08G 1/16* (2006.01)
*B62D 6/10* (2006.01)
*B60W 30/09* (2012.01)
(Continued)

(52) U.S. Cl.
CPC ............. *B62D 6/003* (2013.01); *B60W 30/09* (2013.01); *B60W 30/18163* (2013.01); *B60W 50/16* (2013.01); *B62D 6/10* (2013.01); *G08G 1/165* (2013.01); *G08G 1/166* (2013.01); *G08G 1/167* (2013.01); *B60W 2540/18* (2013.01); *B60W 2710/202* (2013.01)

(58) Field of Classification Search
CPC ......... B62D 6/003; B62D 6/10; B60W 30/09; B60W 50/16; B60W 30/18163; B60W 2710/202; B60W 2540/18; G08G 1/167; G08G 1/166; G08G 1/165
See application file for complete search history.

(56) References Cited

U.S. PATENT DOCUMENTS

| 8,392,062 | B2 | 3/2013 | Oechsle et al. | |
|---|---|---|---|---|
| 9,174,641 | B2 * | 11/2015 | Fritz | B60W 10/18 |
| 9,187,117 | B2 * | 11/2015 | Spero | B62D 1/28 |

(Continued)

FOREIGN PATENT DOCUMENTS

| JP | 2006297983 A | 11/2006 |
|---|---|---|
| JP | 2010076734 A | 4/2010 |
| JP | 2012221463 A | 11/2012 |

*Primary Examiner* — Jeffrey C Boomer
(74) *Attorney, Agent, or Firm* — Raymond L. Coppiellie; Burgess Law Office, PLLC

(57) ABSTRACT

A motor vehicle including a sensor device detecting the current vehicle surroundings and an auxiliary device producing a steering torque on a steering control of the motor vehicle. A data processing device connected to the sensor device and the auxiliary device determines a free escape lane for the motor vehicle by considering the signals of the sensor device to determine the existence of an imminent impact or collision in a current driving situation. If an imminent impact or collision appears likely the data processing device actuates the auxiliary device to produce a temporary steering torque on the steering control. The steering control can be temporarily displaced, moved, or turned to a defined extent in an evasive steering direction to steer the motor vehicle into the free escape lane.

1 Claim, 3 Drawing Sheets

(51) Int. Cl.
*B60W 50/16* (2020.01)
*B60W 30/18* (2012.01)

(56) References Cited

U.S. PATENT DOCUMENTS

| | | | | |
|---|---|---|---|---|
| 9,211,911 | B2* | 12/2015 | Stahlin | B62D 6/003 |
| 9,227,632 | B1* | 1/2016 | Lee | B60W 30/0953 |
| 9,428,219 | B2* | 8/2016 | Flehmig | B62D 6/002 |
| 9,569,968 | B2* | 2/2017 | Strauss | B60T 7/22 |
| 9,630,628 | B2* | 4/2017 | Holub | B60W 40/08 |
| 2004/0030498 | A1* | 2/2004 | Knoop | B60T 7/22 |
| | | | | 701/301 |
| 2004/0193374 | A1* | 9/2004 | Hac | B60K 31/0008 |
| | | | | 701/301 |
| 2007/0299610 | A1* | 12/2007 | Ewerhart | B60T 7/22 |
| | | | | 701/301 |
| 2011/0196576 | A1 | 8/2011 | Stahlin | |
| 2014/0032049 | A1* | 1/2014 | Moshchuk | B62D 15/0265 |
| | | | | 701/42 |
| 2015/0025784 | A1* | 1/2015 | Kastner | B60W 30/09 |
| | | | | 701/119 |
| 2016/0039459 | A1* | 2/2016 | Spero | B62D 1/28 |
| | | | | 701/25 |
| 2017/0291602 | A1* | 10/2017 | Newman | B60W 50/16 |

* cited by examiner

SYSTEM AND METHOD FOR OPERATING A MOTOR VEHICLE

CROSS-REFERENCE TO RELATED APPLICATIONS

Not Applicable.

BACKGROUND OF THE INVENTION

1. Field of the Invention

The present invention relates generally to a system and method for controlling a motor vehicle; and more specifically, to a sensor and auxiliary device for producing a steering torque on a steering system of the vehicle.

2. Description of Related Art

Motor vehicles are often equipped with different assistance systems to improve vehicle controllability or ride comfort. Such assistance systems may include a steering assistance system or a braking assistance system that carries out emergency maneuvers of the motor vehicle, in particular to avoid accidents.

In a hazardous situation, the system provides a driver with steering assistance by influencing a steering device of the motor vehicle. The system may include a vehicle surroundings detection mechanism, a trajectory calculation unit calculating driving stages of drivable and stable trajectories of motion based on the data of the vehicle surroundings detection mechanism, and a mechanism that assesses current steering wheel operation in a hazard situation. On detecting a hazard situation, the trajectory of motion corresponding to the driving maneuver indicated by the current steering wheel operation is determined from the currently determined driving stages. The driver is assisted by influencing the steering device during the driving maneuver depending on the determined trajectory of motion.

Such systems may also warn a driver of a motor vehicle on detecting an impending collision with an obstruction using a visible or audible signal. The system may also upon detecting an impending collision with an obstruction automatically initiate a collision attenuating braking process to reduce collision impact energy. When the braking process cannot prevent, or attenuate, a collision, it can be advantageous to carry out an evasion maneuver. Should the driver start an evasive maneuver during an automatically initiated braking process the system can initiate a steering assist function.

Initially the system monitors the driver steering process and waits for driver input before initiating a steering assist function. However, an inattentive or inexperienced driver can be overwhelmed by an impending collision with an obstruction. In particular, the driver can be deterred from the timely initiation of an evasion maneuver because of shock, because of staring at the obstruction, or because of a false feeling that a steering process can no longer avoid the collision. Whereby any evasive maneuver is either too late or not at all. Often a driver has response time to initiate a suitable evasion maneuver shortly before an impending rear-impact accident; not using this response time reduces the possibility of successfully avoiding rear-impact accidents.

SUMMARY OF THE INVENTION

A motor vehicle including a sensor device detecting current motor vehicle surroundings and an auxiliary device for producing an indicative steering torque on a steering control of the motor vehicle. A one data processing device connected to the sensor device and the auxiliary device obtains sensor information and based thereon generates a control signal to the auxiliary device to generate an indicative steering torque.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
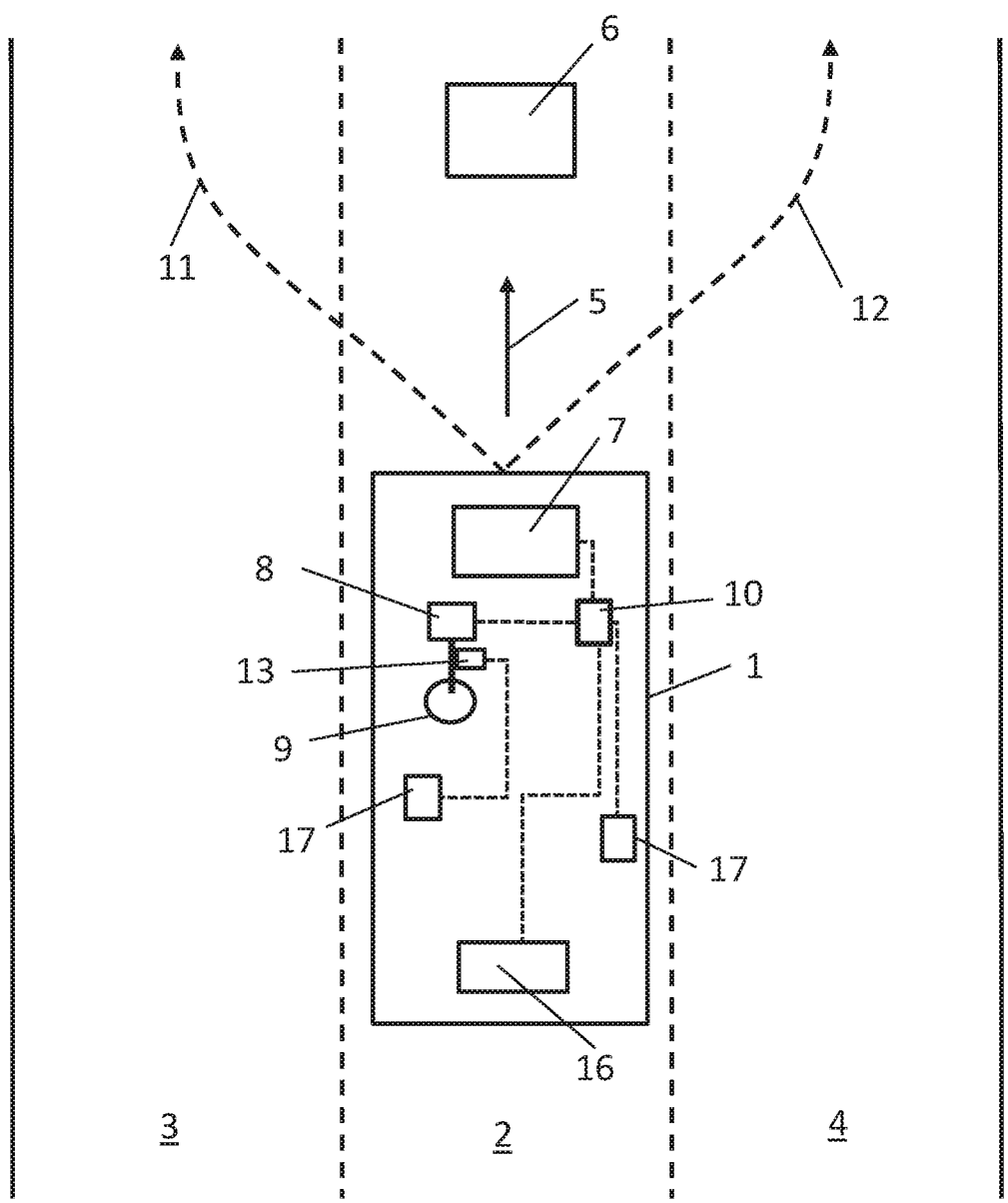
FIG. 1 is a schematic representation of an exemplary embodiment of a motor vehicle having a system according to the invention.

FIG. 1 schematically illustrates an exemplary embodiment of a motor vehicle 1 having a system according to the invention. The motor vehicle 1 travels on a center highway lane 2 between additional highway lanes 3, 4. An obstruction 6, for example an object in the highway lane 2 or a slow-moving/stationary vehicle in the highway lane 2, is located ahead of the motor vehicle on 1 in the driving direction of the motor vehicle 1 indicated by the arrow 5.

The motor vehicle 1 includes a sensor device 7 that detects current surroundings of the motor vehicle 1. The sensor device detects the surroundings of the motor vehicle 1 lying ahead of the motor vehicle 1 in the driving direction of the motor vehicle 1. The sensor device 7 may be a system such as an optical system, a radar system, or a LiDAR system.

The motor vehicle 1 also includes an auxiliary device 8 producing a steering torque on a vehicle steering control 9, typically a steering wheel of the motor vehicle 1. The auxiliary device 8 may include a feedback actuator of an active steering system, in particular of a steer-by-wire system, or a power steering assembly a power steering system.

The motor vehicle 1 has a data processing device 10 connected to the sensor device 7 and the auxiliary device 8. The data processing device 10 can be part of the already present vehicle electronics or configured as a separate unit.

The data processing device 10 determines a free escape lane for the motor vehicle 1 based on the signals of the sensor device 7. In the driving situation shown, the data processing device 10 may determine that both the left highway lane 3 and also the right highway lane 4 are free escape lanes. A diversion of the motor vehicle 1 illustrated by the arrows 11, 12 onto one of these escape lanes prevents an impact or collision of the motor vehicle 1 with the obstruction 6.

By considering the signals of the sensor device 7 the data processing device 10 may determine existence of an imminent impact or collision with the obstruction 6. As part of the determination, the data processing device 10 determines the current distance between the motor vehicle 1 and the obstruction 6 from the signals of the data processing device 10. Other driving state parameters of the motor vehicle 1 are received and used in the determination, for example the vehicle driving speed, detected by a vehicle sensor system. Based on sensor information of the current surroundings the data processing device 10 determines whether a collision with the obstruction 6 is imminent in the given driving situation.

Figure 2:
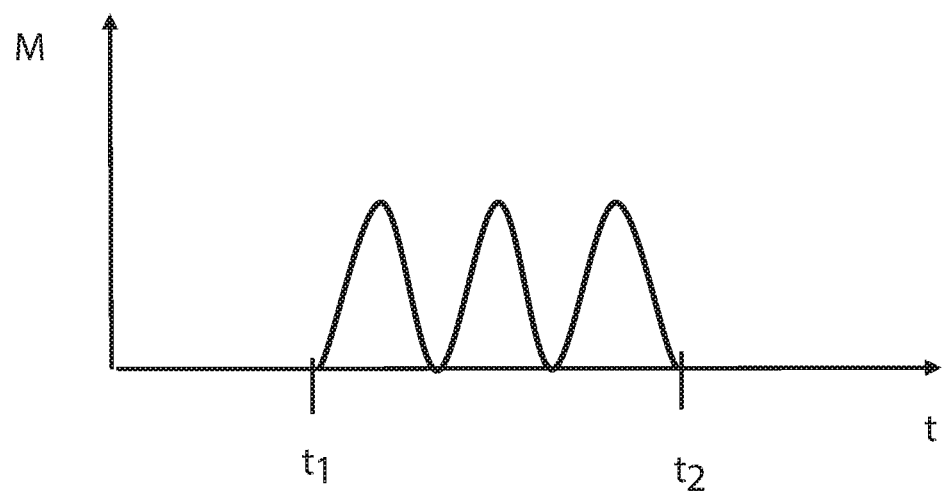
FIG. 2 is a graphic representation of an exemplary embodiment of an indicative steering torque according to the invention.
Figure 3:
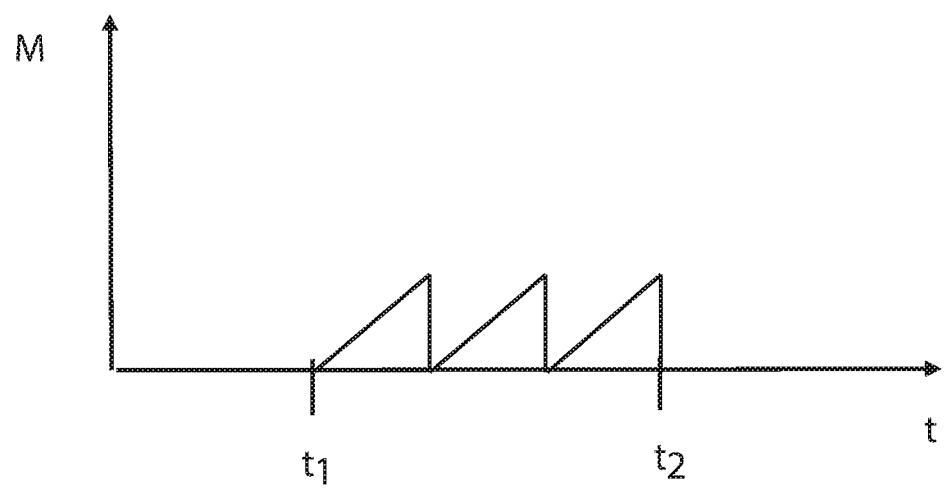
FIG. 3 it is a graphic representation of a further exemplary embodiment of an indicative steering torque according to the invention.

If an impending impact or collision with the obstruction 6 appears likely the data processing device 10 sends an actuating signal to the auxiliary device 8 whereby the auxiliary device 8 produces a temporary indicative steering torque on the steering control 9. The temporary indicative steering torque temporarily displaces, moves or turns the steering control 9 in a defined manner to indicate or provide the driver with a suggestion on the direction to steer the motor vehicle in an evasive steering maneuver, for example into a free escape lane 3, 4. In the driving situation shown, the data processing device may determine the side or lane the motor vehicle 1 should divert to, for example the left highway lane 3 or the right highway lane 4, and the steering control 9 is displaced in the respective evasive steering direction and to the predetermined extent by the auxiliary device 8 to indicate this direction to the driver. The auxiliary device 8 produces the indicative steering torque whereby the driving direction of the motor vehicle 1 is not changed or is only changed insignificantly by the indicative steering torque. The auxiliary device 8 may also vary the magnitude of the indicative steering torque against time. The indicative steering torque can, for example, be produced by the auxiliary device 8 in an amount and frequency as illustrated in FIG. 2 or 3.

The motor vehicle 1 also includes a sensor unit 13 connected to the data processing device 10 to detect steering movements of the steering control 9. The auxiliary device 8 stops generation of the indicative steering torque upon detection by the sensor unit 13 of a manual steering intervention by a driver of the motor vehicle 1. The auxiliary device 8 also stops generation of the indicative steering torque if the steering control 9 has not continued to be displaced in the evasive steering direction after expiration of a predetermined period of time.

The motor vehicle 1 also includes a sensor device 16 detecting the surroundings of the motor vehicle 1 behind the motor vehicle 1 in the driving direction of the motor vehicle 1. Further, the motor vehicle 1 may include additional sensor devices 17 detecting the lateral surroundings of the motor vehicle 1. The sensor devices 16 and 17 are connected to the data processing device 10. In one embodiment, the sensor device 16 or 17 may include an optical system, a radar system, or a LiDAR-system.

By considering signals of the sensor devices 16, 17 the data processing device 10 determines whether the adjacent left and right highway 3, 4, escape lanes are blocked by a vehicle traveling next to the motor vehicle 1 or by a vehicle approaching the motor vehicle 1 from behind. If the adjacent or highway escape lanes 3, 4 are blocked, the auxiliary device 8 prevents or stops generation of the indicative steering torque.

FIG. 2 it is a representation of an exemplary embodiment of an indicative steering torque according to the invention. The magnitude M of the indicative steering torque is plotted against time t. The indicative steering torque is produced in the period of time $t_1$ to $t_2$ in the form of a wave profile 14 having three crests. The wave profile 14 displaces the steering control of the motor vehicle 1 in the evasive steering direction three times in succession in a pulsed manner.

FIG. 3 it is a representation of a further exemplary embodiment of an indicative steering torque according to the invention. The magnitude M of the indicative steering torque is plotted against time t. The indicative steering torque is produced in the period of time $t_1$-$t_2$ in the form of a saw tooth profile 15 with three saw teeth. The sawtooth profile 15 displaces the steering control of the motor vehicle in the evasive steering direction three times in succession in a pulsed manner.

Figure 4:
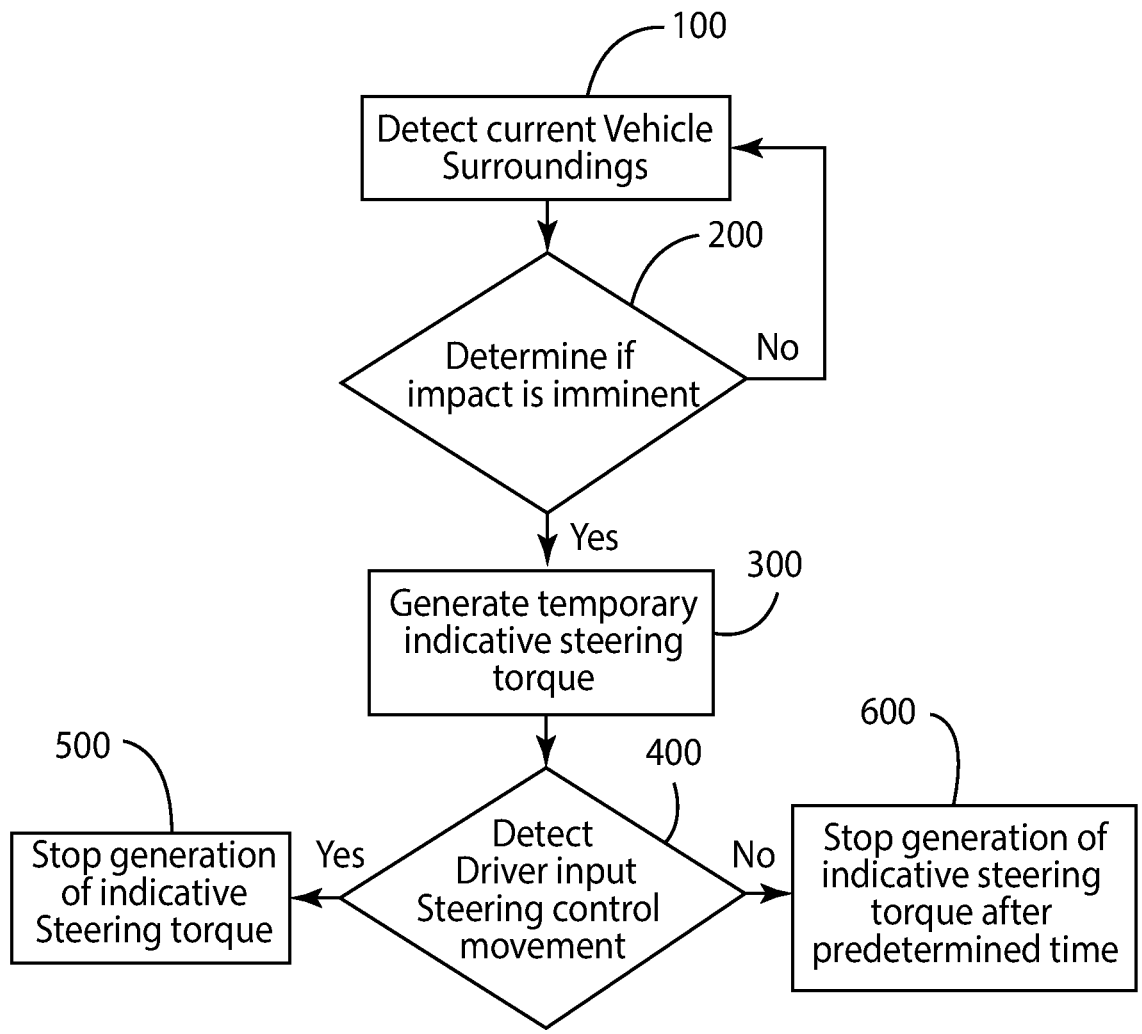
FIG. 4 is a flowchart of a method according to the invention.

FIG. 4 is a schematic flowchart illustrating an example of a process of a method according to the invention for operating a motor vehicle.

In process step 100, the system detects the current vehicle surroundings. In addition, a free or open escape lane for the motor vehicle is determined by considering the current vehicle surroundings.

In process step 200, the system determines whether an impact or collision is imminent in a current driving situation based on the current motor vehicle surroundings. If the determination in process step 200 indicates that no impact or collision is imminent, then no corresponding indicative steering torque is produced in process step 300 and the method returns to process step 100 wherein the system continues to detect current vehicle surroundings.

If the determination indicates that an impact or collision is imminent, in process step 300 a temporary indicative steering torque is produced on a steering control 9 of the motor vehicle 1. The steering control 9 is temporarily displaced, moved or turned, in a predefined amount by the indicative steering torque, in an evasive steering direction. The steering control 9 temporarily displaced, moved or turned to indicate to the driver a direction to steer the motor vehicle in to the free escape lane. The indicative steering torque does not steer the vehicle, the indicative steering torque is produced to provide the driver with a direction to steer the vehicle, the indicative steering torque slightly or insignificantly changes the driving direction of the motor vehicle. The magnitude of the indicative steering torque can be varied against time.

In process step 300 also makes a determination whether the escape lane 3, 4 is blocked by a vehicle traveling beside the motor vehicle 1 or by a vehicle approaching the motor vehicle 1 from behind. Generation of the indicative steering torque is prevented or stopped if the escape lane is correspondingly blocked.

In process step 400, steering movements of the steering control are detected. If a manual steering intervention by a driver of the motor vehicle is detected during the generation of the indicative steering torque, the generation of the indicative steering torque is stopped in process step 500. If in process step 400 it is detected that the steering control has not continued to be displaced in the evasive steering direction after expiration of a predetermined period of time, the generation of the indicative steering torque is stopped in process step 600.

The motor vehicle 1 includes at least one sensor device 7 that detects the current surroundings of the motor vehicle 1. An auxiliary device 8 produces a steering torque on a steering control 9 of the motor vehicle with a one data processing device 10 connected to the sensor device 7 and the auxiliary device 8. The data processing device 10 receiving a signal from the sensor device 7 and determining, based on the received signal, a free or open, that is unoccupied, escape lane for the motor vehicle 1. By considering sensor device 7 signals the system determines whether an impact or collision is imminent in a current driving situation. If so, the system activates the auxiliary device 8 that produces a temporary indicative steering torque on the steering control. The temporary indicative steering torque temporarily displaces the steering control 9 to a predefined extent and in an evasive steering direction that the steering control should be displaced to steer the motor vehicle 1 into a free escape lane. The auxiliary device produces and applies the indicative steering torque to the steering control 9 in a manner so the driving direction of the motor vehicle is not changed or is only insignificantly changed by the indicative steering torque.

Production of the indicative steering torque or an indicative steering control displacement results in a driver of the motor vehicle being advised on the direction in which an evasive movement of the motor vehicle should be carried out to avoid an impending impact or collision in the current driving situation. Before the driver has initiated an evasion steering maneuver production of the indicative steering torque occurs. Temporarily displacing or rotating the steering control 9, for example a steering wheel, to the determined extent in the evasive steering direction gives the driver a haptically perceivable recommendation of the direction the driver should turn the steering control 9 to initiate a promising evasion maneuver. The system does not wait for driver response time, nor does it wait until the driver has initiated a steering maneuver enabling more time for the driver to successfully initiate the evasion maneuver after sensing the indicative steering torque. Even an inexperienced or distracted driver can be encouraged to initiate a promising evasion maneuver in as timely a manner as possible.

The sensor device 7 may include an optical sensor system, for example with at least one camera, a radar system, an ultrasonic system, or a LiDAR-system. The sensor device detects the current motor vehicle surroundings. The respective current motor vehicle surroundings are detected, preferably without interruption, while the motor vehicle is traveling. In particular, the surroundings ahead of the motor vehicle 1 in the driving direction of the motor vehicle 1 are detected by the sensor device 7. For example, detecting the motor vehicle surroundings using the sensor device 7 includes, detecting highway lanes ahead, vehicles ahead, an obstruction ahead on the highway, and adjacent or nearby vehicles.

The data processing device 10 may be an engine control unit, a separate control unit, existing vehicle electronics, or a separate unit. The data processing device 10 typically includes a processor unit, and an accessible memory unit. Signals generated by the sensor device 7 and signals of vehicle electronics representing a driving state parameter of the motor vehicle 1 are delivered to the data processing device 10 as input signals. The data processing device 10 generates signals for actuating the auxiliary device 8 based on the information obtained from the input signals. In addition, the data processing device 10 may also generate signals for actuating a brake system of the motor vehicle and/or at least one warning signal making the driver audibly and/or visually aware of the existence of a risk of an impact or collision.

The data processing device 10 may also determine a current distance of the motor vehicle 1 from a vehicle ahead, or an obstruction ahead, by considering data or signals produced by the sensor device 7. The data processing device 10 may also determine an approach speed at which the motor vehicle 1 is approaching a vehicle or an obstruction ahead of the vehicle 1 using data or signals produced by the sensor device 7 and driving state parameters of the motor vehicle 1 obtained from a vehicle sensor system. Based on the obtained information, the data processing device 10 can estimate a possible collision risk and assess whether an impact or collision is imminent in a current driving situation.

The data processing device determines whether an escape lane or two or more escape lanes are free, or available based on sensor device signals. The determination carried out, preferably without interruption, while the motor vehicle is traveling. An escape lane means an available, open, or possible lane or space that the motor vehicle is steered into and occupies to reduce or avoid an impending impact or collision of the motor vehicle with an obstruction.

The auxiliary device producing a steering torque on the steering control of the motor vehicle can, for example, be in the form of a feedback actuator of an active steering system, in particular of a steer-by-wire system, or in the form of a power steering assembly of a power steering system.

The temporary indicative steering torque produced by the auxiliary device on the steering control can be haptically perceived by the driver, preferably without disturbing or distracting the driver. Producing the indicative steering torque such that the driving direction of the motor vehicle is not or is only insignificantly changed by the indicative steering torque, means that the indicative steering torque is not and cannot be used to carry out an autonomous steering process of the motor vehicle or for a steering assist function. The indicative steering torque is used only to indicate to the driver a direction he could turn or rotate the steering control to carry out a promising evasion maneuver. Temporarily producing the auxiliary steering torque means that the auxiliary steering torque or the steering suggestion given to the driver as a result is only produced in a period of time of predetermined length to disturb the driver as little as possible, while providing a definite steering suggestion. The extent the steering control can be temporarily displaced in the respective evasive steering direction is to be selected to be small such that it is not or cannot be used to carry out an autonomous steering process of the motor vehicle or for a steering assist function. In particular, if the motor vehicle comprises an active steering system, in particular an active front wheel steering system, the indicative steering torque can be produced without the current driving direction of the motor vehicle being changed by the indicative steering torque.

The motor vehicle includes a sensor unit 7 connected to the data processing device 10 for detecting steering movements of the steering control 9, wherein the auxiliary device 8 stops the generation of the indicative steering torque upon detection of manual steering intervention by the sensor unit seven or if the steering control 9 has not been displaced further in the evasive steering direction after the expiration of a predetermined period of time. If the driver carries out a manual steering intervention during the generation of the indicative steering torque, detected by the sensor unit 7 of the data processing device 10, for example a steering angle sensor, generation of the indicative steering torque can be stopped. Manual steering intervention of the driver can be carried out so the driver follows the indicative steering torque suggestion and displaces or rotates the steering control 9 further in the proposed evasive steering direction. If the driver follows the steering suggestion given by the indicative steering torque, generation of the indicative steering torque can be stopped, because the indicative steering torque has fulfilled the purpose thereof and is not used or suitable for providing steering assistance. If the manual steering intervention of the driver is such that the driver does not follow the steering suggestion given with the indicative steering torque, and displaces the steering control in the opposite direction to the proposed evasive steering direction, generation of the indicative steering torque is stopped in order not to disturb the driver when carrying out the intended evasion maneuver. If the data processing device 10 detects, based on signals from the sensor unit 7, that the steering control 9 has not continued to be displaced in the evasive steering direction, after expiration of a predetermined period of time or a period of time of predetermined length, it is assumed that the driver does not wish to follow the steering suggestion given with the indicative steering torque. In such a case, generation of the indicative steering torque is stopped to not disturb the driver during the intended evasion maneuver. The driver through manual steering intervention, may at any time adopt or reject the steering suggestion given with the indicative steering torque without the driver being disturbed when carrying out an intended evasion maneuver.

The auxiliary device 8 may also vary the magnitude of the indicative steering torque against time. For example, the magnitude of the indicative steering torque can rise against time in a ramp-shaped manner up to a predetermined maximum value and then fall. The magnitude of the indicative steering torque can be varied in the form of a periodic wave profile against time. The magnitude of the indicative steering torque can be varied against time in the form of a periodically pulsing saw tooth profile. In addition, the timing and the magnitude of the indicative steering torque can be varied by the auxiliary device 8 or the actuation thereof with the data processing device 10. For example, immediately after determining an impending impact or collision in a current driving situation, the magnitude of the indicative steering torque can be selected to be relatively small. If a brake system of the motor vehicle is pre-loaded by a corresponding actuation by the data processing device 10 after detecting an impending or imminent impact or collision in the current driving situation, the magnitude of the indicative steering torque can be increased. The magnitude of the indicative steering torque can be increased further from the start of an autonomous or assisted braking process by the pre-loaded brake system of the motor vehicle. The magnitude of the indicative steering torque is increased with increasing impact or collision risk to give the driver an increasing steering suggestion depending on the impact or collision risk.

The data processing device 10 may also determine whether the escape lane is blocked by a vehicle traveling next to the motor vehicle, or a vehicle approaching the motor vehicle from behind, based on sensor device 7 signals. The data processing device 10 may actuate the auxiliary device 8 when the escape lane is blocked to prevent or stop generation of the indicative steering torque. The sensor device 7 may also detect the surroundings behind the motor vehicle in the driving direction of the motor vehicle and/or lateral surroundings can be detected with the sensor device 7. Based on the sensor device 7 signals the data processing device 10 may prevent or stop generation of the indicative steering torque whereby the driver it is not encouraged by an indicative steering torque to steer the motor vehicle onto the blocked escape lane, which would be associated with a risk of a lateral impact or collision.

The method, according to an exemplary embodiment, for operating a motor vehicle includes detecting the current surroundings of the motor vehicle and determining the existence of a free escape lane for the motor vehicle by considering the current surroundings of the motor vehicle. Upon determining an imminent impact or collision in a current driving situation, based on the current vehicle surroundings, a temporary indicative steering torque is produced on a steering control of the motor vehicle that temporarily displaces the steering control a defined extent in an evasive steering direction. The evasive steering direction is the direction the steering control should be displaced to steer the motor vehicle into a free escape lane. The produced indicative steering torque is such that the driving direction of the motor vehicle is not changed or is only changed insignificantly by the indicative steering torque.

The advantages mentioned above in relation to the motor vehicle are correspondingly associated with the method. In particular, the motor vehicle can be used to carry out the method according to one of the aforementioned embodiments or any combination of at least two of said embodiments with each other. To this extent, other embodiments of the motor vehicle can be embodiments of the method, even if explicit reference thereto is not made.

The steering movements of the steering control 9 are detected, wherein the generation of the indicative steering torque is stopped if a manual steering intervention is detected during the generation of the indicative steering torque or if the steering control has not continued to be displaced in the evasive steering direction after expiration of a predetermined period of time. The advantages mentioned above in relation to the corresponding embodiment of the motor vehicle are correspondingly associated with this embodiment.

The magnitude of the indicative steering torque is varied against time. The advantages mentioned above in relation to the corresponding embodiment of the motor vehicle are correspondingly associated with this embodiment.

In addition, it is determined whether the escape lane is blocked by a vehicle traveling next to the motor vehicle or by a vehicle approaching the motor vehicle from behind, wherein the generation of the indicative steering torque is prevented or is stopped if the escape lane is correspondingly blocked. The advantages mentioned above in relation to the corresponding embodiment of the motor vehicle are correspondingly associated with this embodiment.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A vehicle steering system comprising:
a sensor generating a signal;
an actuator applying a temporary indicative steering torque on a steering control of the vehicle based on said signal;
applying the temporary indicative steering torque in an evasive steering direction toward a vehicle escape lane when a collision is imminent wherein the indicative steering torque does not significantly change vehicle direction; and including a second sensor connected to the steering control wherein the actuator stops generation of the temporary indicative steeringtorque when the second sensor detects that continued displacement of said steering control in the evasive steering direction ceases after expiration of a predetermined period of time.

\* \* \* \* \*